Figure 1:
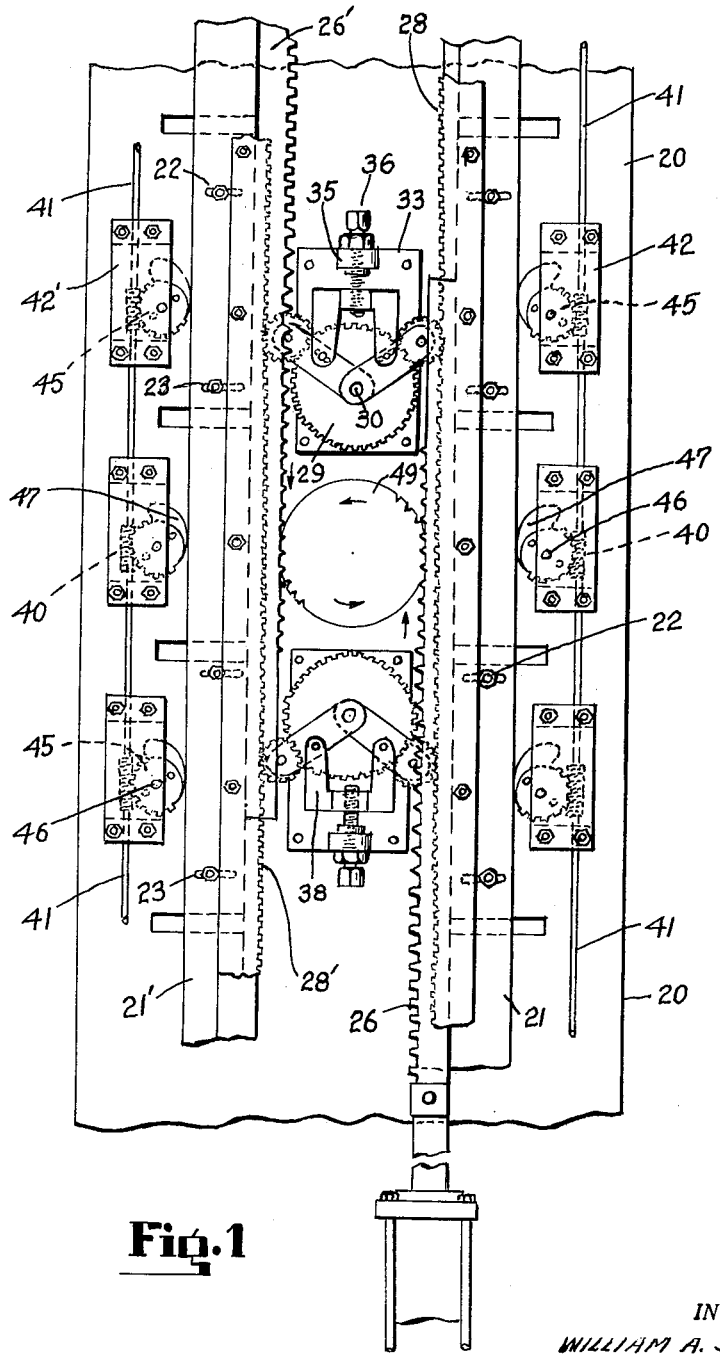

April 9, 1963   W. A. STARCK   3,084,572
GEAR-FORMING METHOD AND APPARATUS
Filed Feb. 10, 1959   5 Sheets-Sheet 1

INVENTOR.
WILLIAM A. STARCK
BY John W. Graham
ATTORNEY

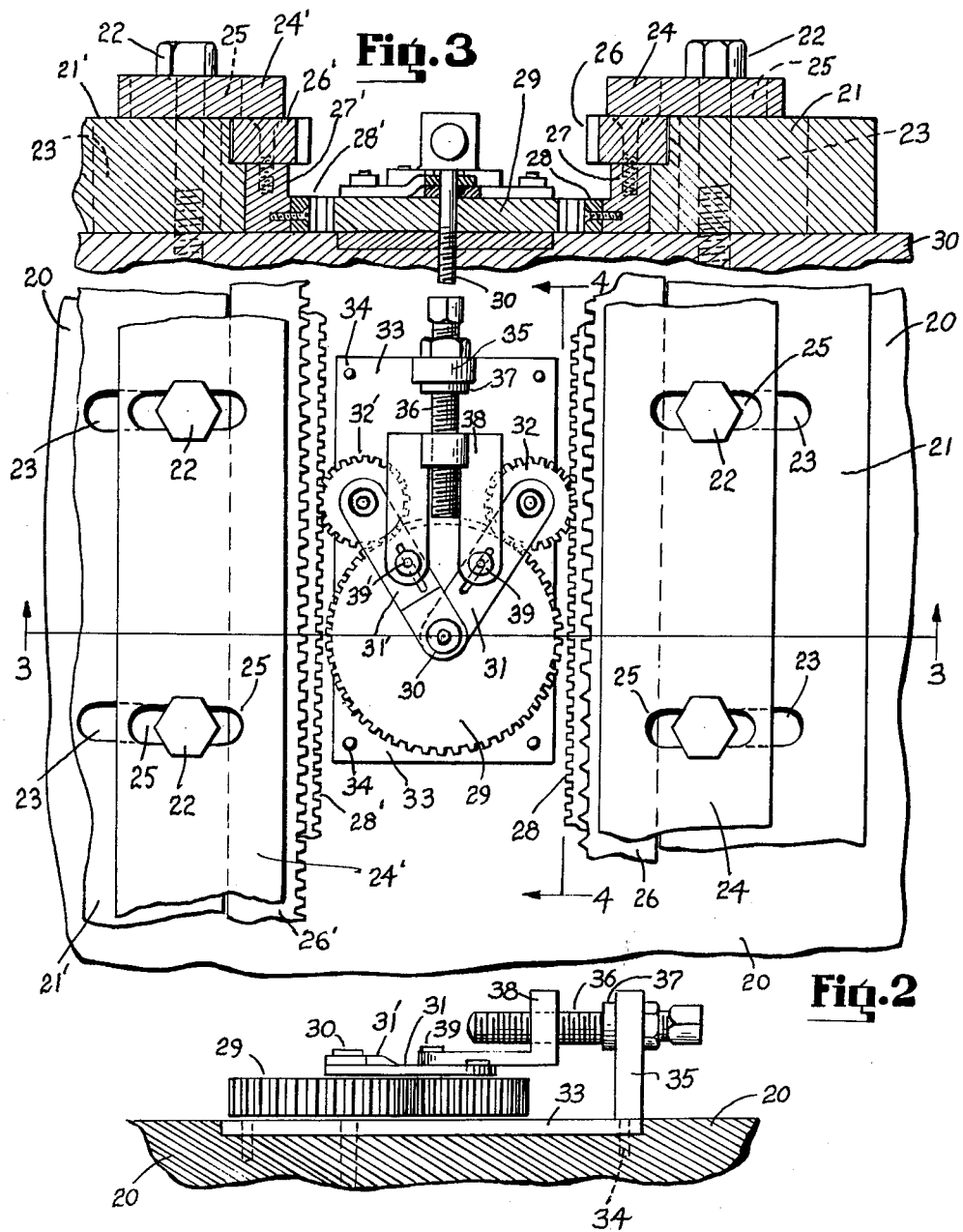

April 9, 1963 W. A. STARCK 3,084,572
GEAR-FORMING METHOD AND APPARATUS
Filed Feb. 10, 1959 5 Sheets-Sheet 3

INVENTOR.
WILLIAM A. STARCK
BY John W. Graham
ATTORNEY

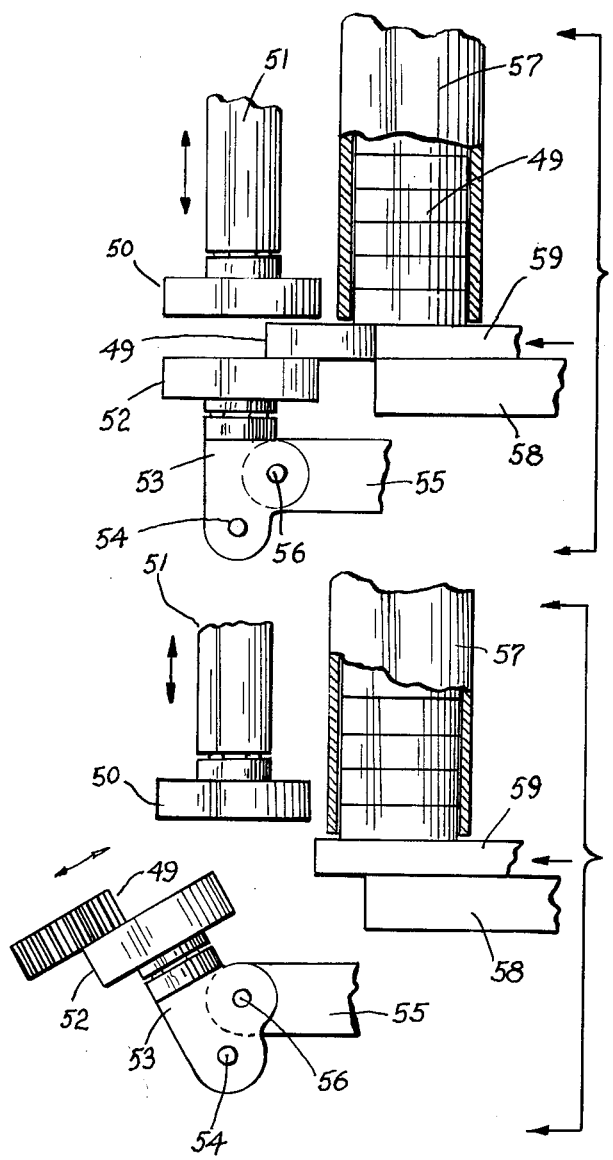
Fig.10
Fig.12
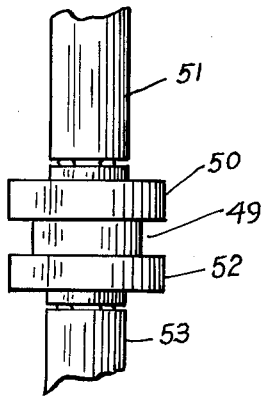
Fig.11
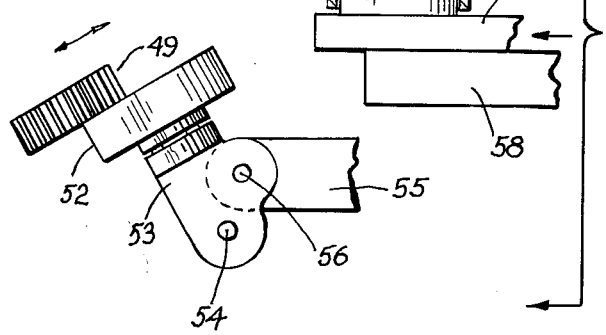
INVENTOR.
WILLIAM A. STARCK
BY John W. Graham
ATTORNEY April 9, 1963 W. A. STARCK 3,084,572
GEAR-FORMING METHOD AND APPARATUS
Filed Feb. 10, 1959 5 Sheets-Sheet 5
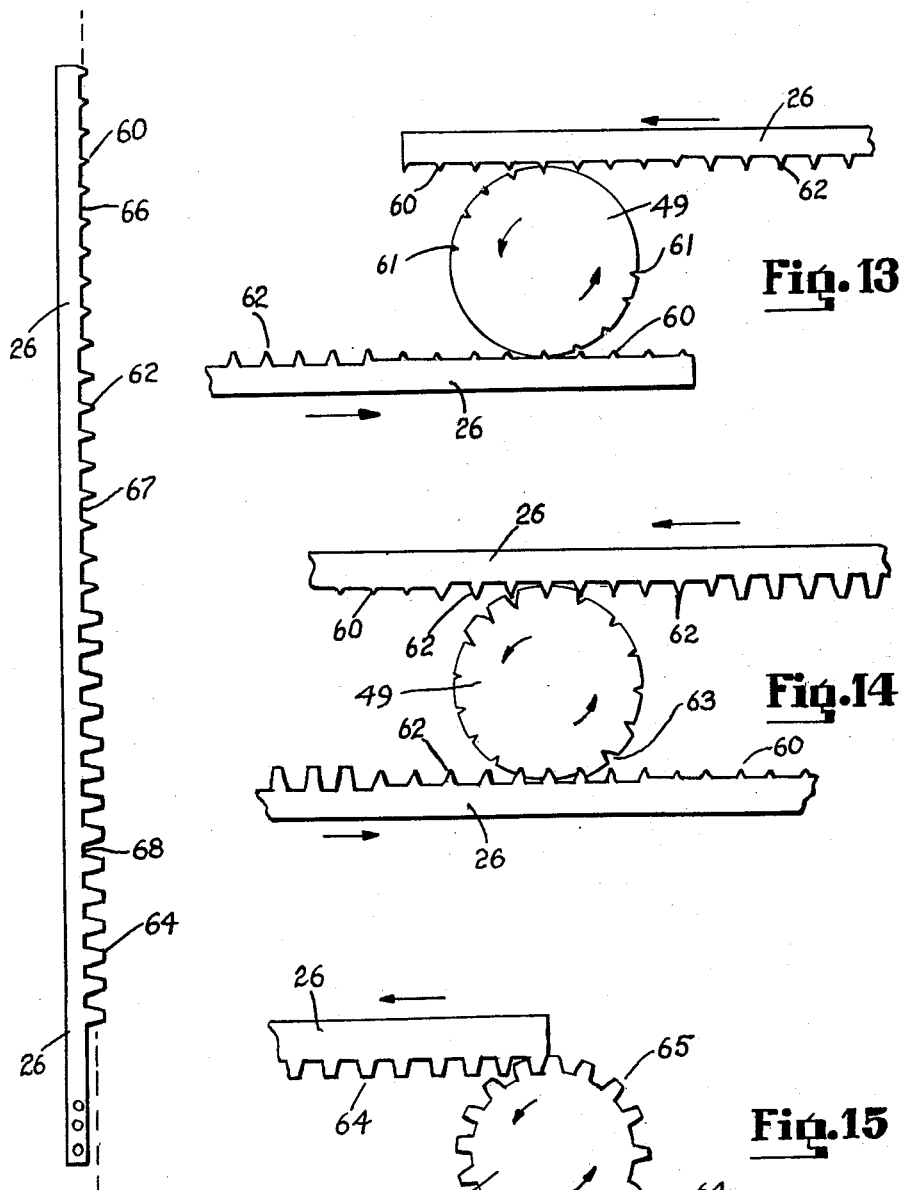
INVENTOR.
WILLIAM A. STARCK
BY John W. Graham
ATTORNEY United States Patent Office 3,084,572
Patented Apr. 9, 1963

3,084,572
GEAR-FORMING METHOD AND APPARATUS
William A. Starck, 2635 N. 59th St., Milwaukee, Wis.
Filed Feb. 10, 1959, Ser. No. 792,340
1 Claim. (Cl. 80—16)

This invention relates to a method and to apparatus for forming predetermined configurations in the circumferential surface of a cylindrical blank as exemplified by teeth on a gear, and more particularly to a forging method and apparatus for providing teeth along the circumferential surface of spur gears and the like.

A description of the invention is facilitated by considering the same in application to forming the teeth on a spur gear; and considering such gear structures, it is well known that in the conventional manufacture thereof the teeth are formed in a hobbing operation in which portions of the gear blank are removed at predetermined locations along the circumferential surface thereto to define teeth therebetween. It is clear that such material removal in no way alters the molecular structure of the blank, and it is equally clear that the original blank must have a diameter at least equal to the addendum circle of the completed gear. Also, the time required to form teeth in a gear blank in the usual hobbing operation is directly related to the number of teeth that must be provided.

As a consequence of the loss of material and the time required to consummate hobbing operations, various efforts have been made to form teeth in a gear blank in a forging operation in which the gear blank is heated and die elements reform the circumferential surface thereof. Such efforts have not been successful for a number of important reasons, one of which is the distortion that occurred in the gear blank resulting from localized and unequal forces applied thereto—for example, as result from pressing a die element into the gear blank at only one point thereon in contradistinction to a case in which at least two die elements are simultaneously pressed into the circumference of a gear blank at diametrically spaced points thereon. Additionally, such prior forging techniques have been in the nature of intermittent steps wherein the die is reciprocated successively toward and away from the gear blank, or vice versa, which results in an operation that is still time-consuming as distinguished from the case wherein an uninterrupted forming movement is provided.

An object of the present invention is to provide an improved method and apparatus for reforming the peripheral surface of a generally cylindrical blank, useful in forming teeth in gear blanks and the like and which obviates the material loss and significant time factor inherent in conventional hobbing operations by employing forging techniques, but wherein the distortion and intermittent characteristics of prior forging efforts are overcome. Another object of the invention is in the provision of a method and apparatus for forming teeth in gear blanks and the like, wherein simultaneous forces of substantially equal magnitude are applied to the circumferential surface of a gear blank at successive diametrically spaced points therealong, whereby undesirable distortion of the gear blank is avoided.

Still another object is that of providing a method and apparatus of the character described, in which the diameter of the gear blank may be substantially equal to the diameter of the pitch circle of the completed gear whereby loss of material does not occur in the tooth-forming operation, and in which material necessarily flows freely from the blank radially to provide the teeth therealong whereby the normal molecular orientation of the gear blank along the outer edge portion thereof is reconstituted and provides a closely grained tooth structure having greater strength and durability. Yet another object is to provide a method and apparatus for forming teeth in heated gear blanks wherein each tooth is incrementally developed at successive times in a continuous operation.

A further object of the invention is in the provision of a method and apparatus for forming teeth in gear blanks, in which a heated gear blank is supported between compression members for rotatable movement so that lateral expansion or deformation of the gear blank is prevented during the tooth-forming operation in which successive points along the circumferential surface of the gear blank have die elements pressed thereagainst to displace material inwardly from such surface to form the dedendum circle of the gear whereby such displaced material flows radially outwardly from the gear blank toward the addendum circle of the finished gear. Still a further object is in the provision of a method and apparatus as described, wherein the rotatably supported and laterally constrained gear blank rollingly engages a pair of facing gear-forming racks diametrically oriented for simultaneous forcible engagement with the circumferential surface of the gear blank to press die elements thereinto, and in which the racks are supported for longitudinal movement in opposite directions to successively press a plurality of die elements carried thereby into the gear blank.

Yet a further object is to provide elongated gear-forming racks of the character described, which are each provided with groups of die elements of successively greater dimension so that the teeth are formed in the gear blank by engagement of the groups of die elements therewith in progressive increments, whereby a continuous operation results with the gear blank rollingly engaging the racks and with the die elements of the successive groups engaging the surface of the gear blank at the precise location therealong previously engaged by the die elements of the preceding groupings. An additional object of the invention is to provide an apparatus of the type described, in which the gear-forming racks are selectively adjustable with respect to the spacing therebetween so that gear blanks of various size can be accommodated. Additional objects and advantages of the invention will become apparent as the specification develops.

An embodiment of the invention is illustrated in the accompanying drawings, in which—

Figure 5:
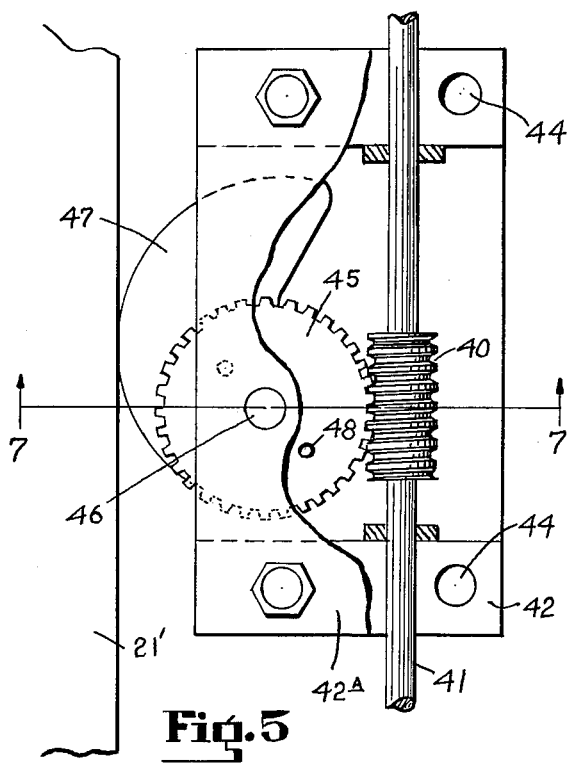
Figure 6:
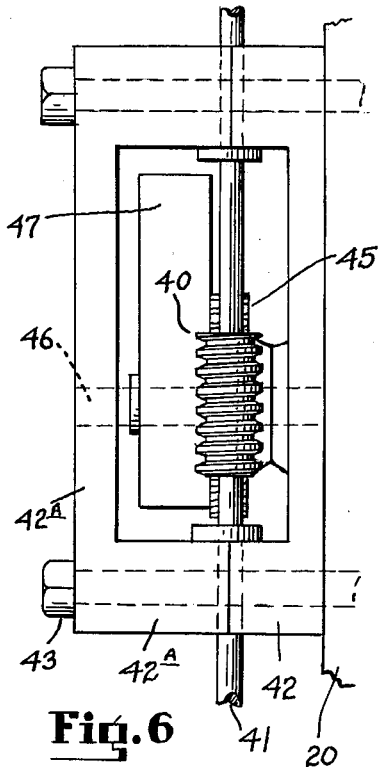
Figure 7:
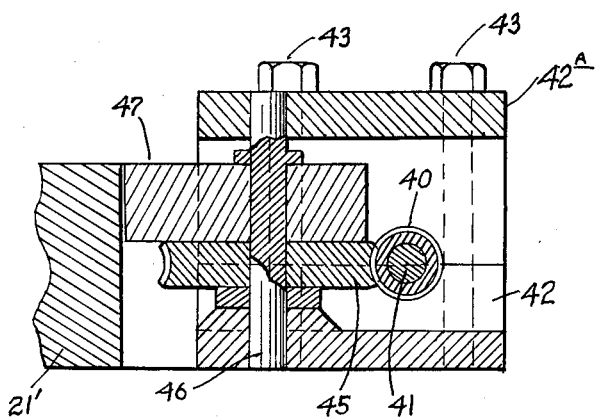
Figure 8:
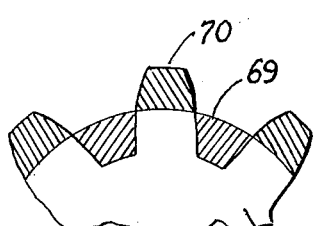
Figure 9:
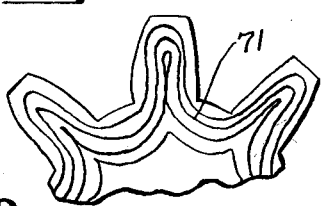

FIGURE 1 is a broken top plan view of the significant portion of apparatus embodying the invention; FIGURE 2 is an enlarged, fragmentary top plan view of a portion of the apparatus illustrated in FIGURE 1, showing the arrangement employed to synchronize longitudinal movements of the reciprocable gear-forming racks; FIGURE 3 is a transverse sectional view taken along the line 3—3 of FIGURE 2; FIGURE 4 is a longitudinal sectional view taken along the line 4—4 of FIGURE 2; FIGURE 5 is an enlarged fragmentary top plan view of a portion of the apparatus illustrated in FIGURE 1 to show the arrangement employed for adjusting the spacing between the gear-forming racks; FIGURE 6 is a side view in elevation of the structure illustrated in FIGURE 5; FIGURE 7 is a transverse sectional view taken along the line 7—7 of FIGURE 5; FIGURE 8 is a largely diagrammatic view of a portion of a spur gear to illustrate the location of the addendum, dedendum and pitch circles of a gear as defined, respectively, by the outer face of the gear, by the flank of the gear, and by the points substantially midway between the face and flank; FIGURE 9 is a diagrammatic view of a gear formed in accordance with the invention, and illustrating the flow of material effected during such formation; FIGURE 10 is a fragmentary view of the magazine and feeder arrangement for supplying gear blanks successively to the constraining discs, and showing an intermediate position in which a gear blank is being fed to the constraining discs; FIGURE 11 is a fragmentary view of the apparatus shown in FIGURE 10, but in which a gear blank is in position between the constraining discs; FIGURE 12 is a fragmentary view substantially identical to that of FIGURE 10, but showing the displacement of a formed gear from the constraining discs; FIGURES 13 through 15 are diagrammatic views illustrating successive steps in the formation of teeth in a gear blank; and FIGURE 16 is a diagrammatic view illustrating the incremental changes in the die elements along the gear-forming racks, but in which the necessary provision of a plurality of die elements of each increment have been omitted to emphasize the incremental changes in the die element groupings.

The exemplary apparatus illustrated in the drawings comprises a platform or surface plate 20 which may be horizontally disposed and supported by any suitable means such as a base or legs (not shown). Such base may also provide the support for the actuating and control mechanism for the apparatus. Supported along the upper surface of the platform 20 are a pair of laterally spaced, longitudinally extending guides or rails 21 and 21' oriented in substantially parallel relation. The rails are respectively secured to the platform 20 by a plurality of bolts or studs 22, which extend through transversely elongated passages 23 provided therefor in the rails and are threadedly received in the openings therefor in the platform. The bolts 22 also extend through clamping plates 24 and 24', respectively associated with the rails 21 and 21'; and more particularly, such bolts extend through transversely elongated slots 25 provided by the clamping plates. It will be noted in FIGURES 2 and 3 that the clamping plates 24 and 24' extend inwardly from the respective rails, and are disposed above the respective gear-forming racks 26 and 26' and help to support the same in position along the rails. It will be noted that each of the rails is provided with an offset portion defining a generally L-shaped recess along the upper inner edge thereof, and an edge portion of a gear-forming rack seats therein.

The gear-forming racks are longitudinally slidable relative to the rails and clamping plates thereof, and are fixedly secured by any suitable means such as screws to drive gear racks comprising respectively the slidable support elements 27 and 27' and gear elements 28 and 28' secured thereto by screw members. It will be apparent that the gear-forming racks 26 and 26' are rigidly related to the drive gear racks 28 and 28', and that the composite structure formed thereby is longitudinally slidable along the platform 20 and guide rails 21—21'. The reciprocable sliding movements of the gear and forming racks may be enforced thereon by any suitable actuating means as, for example, pneumatic or hydraulic cylinder-poston structures which are well known.

The actuating mechanism employed to reciprocate the forming and gear racks must be able to reciprocate the respective forming racks 26—26' simultaneously in opposite directions; and since it is important that such movements of the forming racks be synchronized, mechanism enforcing such synchronous movement thereon is provided and is seen most clearly in FIGURES 2 through 4. The synchronizing mechanism comprises a gear 29 rotatably supported on a pin 30 secured to the platform 20 intermediate the forming racks. Pivotally supported by the pin 30 above the rotatable gear 29 is a pair of links 31 and 31' which are respectively equipped at the outer ends thereof with gears 32 and 32' that are in mesh with the main gear 29, and at the same time are adapted to meshingly engage the respective gear racks 26 and 26'.

As indicated hereinbefore, the guide rails 21 and 21' and related forming and gear racks are laterally or transversely adjustable so as to alter the spacing therebetween, and consequently the angular position of the synchronous gears 32 and 32' along the surface of the main or synchronizing gear 29 must be shifted to maintain engagement of the synchronous gears with the gear racks 28 and 28' irrespective of the lateral spacing therebetween. To accomplish this adjustability requirement, a support plate 33 is provided which is recessed into the platform 20 and is secured thereto by screws 34, and such plate is equipped with a vertically extending standard 35 having a threaded adjusting screw or rod 36 projecting therethrough and through a bearing or shoulder 37 provided therefor in the standard. The adjusting screw threadedly engages an upwardly disposed nut or threaded portion provided by a yoke 38 having bifurcated legs that are respectively connected with the links 31 and 31' by pivot pins 39 and 39' which extend through axially elongated slots in the respective links. Therefore, when the adjusting screw 36 is rotated in one direction, the yoke 38 is moved outwardly therealong to spread the links and thereby displace the synchronous gears 32 and 32' outwardly, and vice versa. A locking nut may be provided to set the adjusting screw with respect to the standard 35.

It will be apparent that when the teeth or die elements are pressed into a gear blank disposed between the forming racks, laterally directed forces of substantial significance will be imparted against the forming racks and consequently against the respective guide rails 21 and 21'. Such forces are overcome by clamping the guide rails to the platform 20. However, it is necessary to maintain parallel alignment of the forming racks; and since the forming racks are laterally adjustable to accommodate gear blanks of various diameter, it is desirable to equalize adjusting movements of the forming racks and enforce a condition of symmetry thereon from end to end thereof. Therefore, a mechanism for accomplishing such a result is provided for each of the guide rails and will now be described. It may be noted that the respective mechanisms are identical, except that necessarily they are oppositely oriented. Therefore, only one such mechanism will be described in detail, and the same numerals will be employed to identify the parts of the corresponding mechanism, except that the numerals will be primed for purposes of differentiating therebetween.

Referring then to FIGURES 5 through 7 in particular, it is seen that each mechanism comprises a plurality of longitudinally spaced worms 40 all mounted upon a shaft 41 so as to be rotated therewith, and the shaft is rotatably journalled in bearing blocks 42 which are rigidly secured to the platform 20 by cap screws 43. Each bearing block 42 has a base that extends along the platform 20 and a pair of spaced uprights projecting upwardly therefrom which define a space or compartment therebetween in which a worm 40 is positioned. A cover or cap 42a extends over the compartment and is secured to the uprights by the cap screws 43. It will be apparent that the cap screws 43 pass freely through the openings 44 provided therefor in the bearing block, through corresponding openings in the cap and into threaded bores provided by the base 20.

Each of the worms 40 is in mesh with a worm gear 45 which is supported by a shaft 46 for rotation about the longitudinal axis thereof. Constrained for movement with the worm gear 45 is a cam 47, and such constraint may be afforded as by means of pins or rivets 48 interconnecting the worm gear and cam. The arcuate or cam surface of the cam member 47 slidably engages the outer surface of the corresponding guide rail 21, and consequently the position of the cams 47 determines the lateral location of the guide rail in engagement therewith. Thus, considering FIGURE 1 it will be seen that a plurality of cams 47 are disposed along each of the guide rails; and since the orientation of all of the cams for each guide rail is determined simultaneously by rotation of the shaft 41 therefor, a condition of precise parallel alignment of the guide rails 21 and 21' as well as the forming racks carried thereby at any position of lateral adjustment of the rails and forming racks, is assured by the cams.

Preferably, gear blanks are fed to a position between the forming racks from a magazine and the gear blanks must be freely rotatable when engaged by the forming racks 26 and 26'. At the same time, the gear blank must be constrained so that it cannot expand in thickness or along the rotational axis thereof during engagement of the forming racks therewith. The support and magazine mechanism is illustrated in FIGURES 10 through 12, and will now be described. The gear blanks are denoted with the numeral 49, and are generally cylindrical elements which have an elevated temperature during the time of engagement thereof by the forming racks so as to facilitate material flow. The gear blank is supported between a pair of compression discs, which are horizontally disposed and are denoted with the numerals 50 and 52. The upper disc 50 is rotatably supported by a shaft 51, and the lower disc 52 is rotatably supported by a bell crank 53 which in turn is supported for pivotal movement about a pin or shaft 54 between the respective positions illustrated in FIGURES 10 and 12. The bell crank is pivotally connected to a lever arm 55 (as shown at 56) by pivot pin or other suitable means. Therefore, the bell crank can be swung between the receive and discharge positions thereof upon longitudinal reciprocatory movement of the lever arm 55.

A stack of individual gear blanks 49 may be supported in a hopper or magazine 57 disposed above a support plate 58, whereby the stack of gear blanks is supported by engagement of the lowermost blank in the stack with the upper surface of the support plate 58. Slidable with respect to the support plate 58 is a pusher or feeder arm 59 adapted to move against the lowermost blank in a stack to shift the same from the support plate 58 to a position interposed between the compression discs 50 and 52, as shown in FIGURE 10. Thereafter, the pusher arm may be retracted so as to permit the stack of gear blanks to move downwardly and onto the support plate 58 so that in a subsequent operation, the next lowermost gear blank can be fed to a position between the compression discs. It will be apparent that means such as pneumatic or hydraulic cylinder-piston apparatus will be provided to effect reciprocation of the pusher; and similarly, corresponding mechanism may be provided if desired to reciprocate the lever arm 55. Also, the shaft 51 which supports the uppermost compression disc 50 is carried for vertical movement so that the disc may be elevated to permit tipping or pivoting of the bell crank 53; or alternatively, sufficient clearance could be afforded by supporting the bell crank for vertical as well as pivotal movement. Further, the hopper or magazine 57 may be an insulated member, and if required, may be heated so as to maintain the temperature of the gear blanks at the necessary level.

The forming racks 26 and 26' are illustrated most clearly in FIGURES 13 through 15, and it will be noted by reference to these figures that the forming racks are reciprocated simultaneously in opposite directions during the tooth-forming operation. Therefore, the orientation and arrangement of the groupings of the individual die elements or prongs 60 are reversed in direction between the forming rack 26 and the rack 26'. It will be noted that a plurality of individual die elements are provided in each group thereof, and specifically in the exemplification illustrated in FIGURES 13 through 15, there are nine die elements in the grouping thereof which initially engages the gear blank 49. This condition is repeated in each of the groupings, and the precise number of die elements in each group will depend upon the intended capacity of the apparatus. That is to say, if the gear racks are to accommodate gear blanks of relatively large diameter, there must be more individual die elements in each group than where gear blanks of small diameter only are to be processed, for a sufficient number of die elements must be provided to assure engagement of the circumferential surface of the gear blank throughout the entire 360° thereof with at least one die element of each group.

It will be noted that the die elements in the respective groupings thereof are located and positioned so that they engage the surface of the gear blank at precisely the same locations therealong; and since the die elements from group to group progressively increase in size, the penetration and consequent deformation of the circumferential surface of the gear blank radially inwardly increases with each group. As a necessary correlary thereof, the areas of the gear blank intermediate the points of force application thereto by the die elements flow radially outwardly in incremental increases with each group until the gear blank is equipped with a completed tooth arrangement along the circumference thereof. The steps in this process are illustrated progressively in FIGURES 13 through 15. FIGURE 16 is a diagrammatic view and is intended to illustrate the concept of the progressive increase in the size of the individual die elements from group to group. It will be evident upon inspection of this figure that it is not intended to be an accurate illustration of the forming racks because tooth groupings are omitted. It will be seen in FIGURE 16 that a broken line is illustrated which extends longitudinally along the forming rack, and such line is parallel to the base of the rack. A divergence is seen then between the broken line and the base of the die elements adjacent the terminal end of the rack. However, toward the initiating end of the rack, the divergence between the broken line and depth of the die elements becomes less and less until they are coincident at the initiating end of the rack.

In operation of the apparatus, a heated gear blank 49 is positioned between the compression discs 50 and 52 and is constrained in such position so that the disc cannot expand in a direction normal to the faces thereof. However, the gear blank is free to rotate since the compression discs are rotatably supported. Such gear blank is then engaged by the initiating ends of the respective forming racks 26 and 26' as those racks are reciprocated in opposite longitudinal directions. Upon engagement of the racks with the gear blank, the gear blank will be rotated and will rollingly engage the die elements of the forming racks. The operation is continuous in the sense that as the forming racks move longitudinally, all of the die elements of one group thereof engage the circumferential surface of the blank and deform the same; and as the die elements of the successive groups reengage the same locations on the blank, the teeth are incrementally formed until completion by engagement thereof with the die elements of the last group. The formed gear is then removed from between the compression discs, and the forming racks are returned to their starting position. This operation may then be repeated cyclically on successive gear blanks.

It will be noted that the starting diameter of the gear blank is substantially equal to the diameter of the pitch circle of the finished gear for the flow of material effected by engagement of the die elements with the circumferential surface of the blank results in certain areas of the blank—that is, the areas intermediate the teeth—being pressed inwardly to the dedendum diameter of the finished gear while such displaced material flows outwardly to form the teeth, the faces of which define the addendum diameter of the finished gear.

While in the foregoing specification an embodiment of the invention has been set forth in considerable detail for purposes of making a complete disclosure thereof, it will be apparent to those skilled in the art that numerous changes may be made therein without departing from the principles and spirit of the invention.

I claim:

In apparatus for forming impressions in the perimetric surface of a substantially cylindrical blank, a pair of rotatably mounted constraining discs of greater diameter than said blank and being adapted to receive and support said blank entirely within the perimetric limits thereof and to apply compressive forces thereto resisting an enlargement of the dimension of said blank as measured between said discs, a pair of forming racks each equipped with a plurality of die elements spaced longitudinally therealong and being oriented in facing relationship to simultaneously impress corresponding die elements thereof into diametrically opposed areas along the perimetric surface of said blank, means for supporting said racks in generally parallel relation for reciprocatory movement along longitudinal axes thereof in opposite directions and between said discs, means for selectively adjusting the spacing between said forming racks to accommodate blanks of various diameters comprising a plurality of abutment cams for each of said forming racks including adjustment structure provided for simultaneously determining the position of the respective abutment cams for each forming rack, means for constraining said forming racks against relative lateral displacement in a direction away from such blank during such longitudinal movements of the forming racks to simultaneously impress the respective die elements thereof into the perimetric surface of said blank at successive intervals therealong, each of said racks having the die elements thereof arranged in groups progressing successively from rough-forming dies to finish-forming dies, and control means operative between said forming racks for synchronizing the longitudinal movements thereof.

References Cited in the file of this patent

UNITED STATES PATENTS

| | | |
|---|---|---|
| 133,452 | Kellogg | Nov. 26, 1872 |
| 319,753 | Simonds | June 9, 1885 |
| 389,168 | Rogers | Sept. 4, 1888 |
| 717,538 | Buhoup et al. | Jan. 6, 1903 |
| 1,001,799 | Anderson | Aug. 29, 1911 |
| 1,377,177 | Anderson | May 10, 1921 |
| 1,568,648 | White | Jan. 5, 1926 |
| 1,619,997 | White | Mar. 8, 1927 |
| 2,886,990 | Bregi | May 19, 1959 |
| 2,930,877 | Pelphrey | Mar. 29, 1960 |

FOREIGN PATENTS

| | | |
|---|---|---|
| 794,946 | Great Britain | May 14, 1958 |
| 797,860 | Great Britain | July 9, 1958 |
| 942,804 | Germany | May 9, 1956 |